United States Patent Office 3,119,865
Patented Jan. 28, 1964

3,119,865
ARYLENE-BIS NITROSO UREAS
Martin L. Weakley, 209 S. Edith St., Sam M. Moffett, 111 Irving St., and Louis E. Craig, 1412 Willow Road, all of Pryor, Okla.
No Drawing. Filed June 15, 1960, Ser. No. 36,165
9 Claims. (Cl. 260—553)

This invention relates to a new class of chemical compounds and their preparation. More particularly it relates to arylenebis- and alkylenebis(3-alkyl-3-nitrosourea)s represented by the following generic formula:

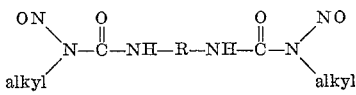

wherein R is a divalent radical selected from the group consisting of arylene and alkylene.

These novel compounds are conveniently prepared by reacting the corresponding bis(3-alkylurea)s in an aqueous acidic solvent, such as acetic, hydrochloric and sulfuric acids, with an alkali metal nitrite, preferably in proportions of about 2 to about 4 times the molar quantity of the bis(3-alkylurea) used. The temperature of the reaction is maintained preferably below normal room temperature, e.g., at about 0° C. to 25° C., and on completion of the reaction the mixture is diluted in ice in order to free the product from solution.

One of the unique features of the procedures used in producing our compounds is the fact that nitrosation of the arylenebis- or alkylenebis(3-alkylurea)s occurs only on the alkyl-substituted nitrogens, rather than on the nitrogens which are adjacent to the alkylene or the arylene group, or on all of the nitrogen. The resulting N-nitroso compounds are stable under ordinary conditions but can be controllably decomposed so that nitrogen is evolved and diisocyanates are produced. It is the foregoing properties that make our novel nitrosoureas useful as combination foaming and coupling agents for the preparation of foamed products, such as foamed polyurethane resins, polyvinyl chloride resins, and other types of foamed resins or plastics.

The arylenebis- and alkylenebis(3-alkylurea)s from which our novel nitroso compounds are derived, may be produced by (Method A) the reaction of an alkylisocyanate with an alkylene or arylene diamine; or by (Method B) reacting alkylene or arylene diisocyanates with an alkylamine according to known procedures.

Thus, Method A involves the reatcion of an aliphatic or aromatic diamine with an alkyl isocyanate, as follows:

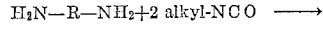
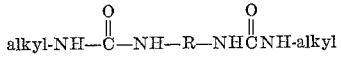

Method B involves the reaction of an aliphatic or aromatic diisocyanate with an alkylamine:

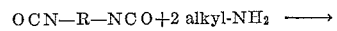
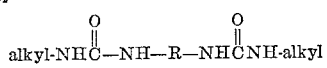

In proceeding with the preparation of the arylenebis- and alkylenebis(3-alkylurea)s used in making our novel compounds in accordance with Method A, the aliphatic or aromatic diamine may be dissolved in an inert organic solvent such as toluene or the like. The alkyl isocyanate is then added dropwise, with cooling and vigorous stirring of the mixture taking place concurrently, the alkyl isocyanate bing added in the ratio of about 2.2 moles per 1.0 mole of the diamine. Heat may be conveniently applied to the mixture at the end of the alkyl isocyanate addition in order to insure completion of the reaction. On cooling, the resulting arylenebis- or alkylenebis(3-alkylurea) is recovered by filtration.

The process followed in preparing the arylenebis- and alkylenebis(3-alkylurea)s in accordance with Method B is similar to Method A, just described, the alkylamine being added dropwise to the aliphatic or aromatic diisocyanate. Where the alkylamine is a gas, it is added at a rate comparable to the dropwise addition used in the case of the liquid alkylamines. Generally speaking, the products prepared in accordance with Method B are purer than those produced by Method A.

Examples of aromatic diamines which may be reacted with alkyl isocyanates in accordance with Method A, above, in preparing arylenebis(3-alkylurea)s suitable for nitrosation to produce our new compounds are:

o-phenylenediamine
m-Phenylenediamine
p-Phenylenediamine
4-ethyl-1,2-phenylenediamine
1,3,5-methoxyphenylenediamine
2-methoxyphenylenediamine
2-chloro-1,4-phenylenediamine (1,2,4-chlorophenylenediamine)
2-bromo-1,4-phenylenediamine
2-nitro-1,4-phenylenediamine
2,3,6-trimethyl-1,4-phenylenediamine
2,3,5,6-tetramethyl-1,4-phenylenediamine
2,6-dichloro-1,4-phenylenediamine
1-methoxy-4-methyl-2,6-phenylenediamine
3-methoxy-1-methyl-4,6-phenylenediamine
2,5-dimethyl-1,4-phenylenediamine
2,6-dimethyl-1,4-phenylenediamine
2,3-dimethyl-1,4-phenylenediamine
1,4-xylylenediamine
2,4-tolylenediamine
2,6-tolylenediamine
2,5-tolylenediamine
3,4-tolylenediamine
6-chloro-2,4-tolylenediamine
6-chloro-2,3-tolylenediamine
6-chloro-3,4-tolylenediamine
2-methoxy-3,4-tolylenediamine
4.4'-biphenylenediamine (benzidine)
2,4'-biphenylenediamine (diphenyline)
2,2'-biphenylenediamine
3,3'-biphenylenediamine
3.3'-dimethyl-6,6'-biphenylenediamine
3,3'-dimethyl-4,4'-biphenylenediamine (3,3'-dimethylbenzidine)
2,6-dimethyl-4,4'-diphenylenediamine (2,6-dimethylbenzidine)
2,2'-dimethyl-5,5'biphenylenediamine
2,2'-dimethyl-6,6'biphenylenediamine
2-chloro-1',4'-biphenylenediamine
5-chloro-2,4'-biphenylenediamine
5,3'-dichloro-2,4'-biphenylenediamine
2,4'-dichloro-5,3'-biphenylenediamine
2,4'-diiodo-5,3'-biphenylenediamine
5-bromo-2,4'-biphenylenediamine
5,3'-dibromo-2,4'-biphenylenediamine
4,4'-dichloro-3,3'-biphenylenediamine
4,4'-dichloro-2,3'-biphenylenediamine
4,4'-2,2'-biphenylenediamine
3,3'-dimethoxy-4,4'-biphenylenediamine (o-dianisidine)
4,4'-dimethoxy-2,2'-biphenylenediamine
4,4'-dimethoxy-3,3'-biphenylenediamine
2,4,6,2',4',6'-hexamethyl-3,3'-biphenylenediamine
2,5-dichlorobenzidine
3,3'-dichlorobenzidine
Octachlorobenzidine
3,5,3',5'-tetrachlorobenzidine 2,2'-dinitrobenzidine
3,5,3',5'-tetrabromo-2,2'-dinitrobenzidine
3,5,3',5'-tetrachloro-2,2'-dinitrobenzidine
3,5,3',5'-tetrabromobenzidine
2,6,2',6'-tetrachlorobenzidine
3,4-diaminodiphenyl, 1,3-diaminodiphenylenedioxide
2,7-diaminodiphenylenedioxide
2,6-diaminodiphenylenedioxide
2-methyl-4,4'-diaminodiphenyl
3,3'-diaminodiphenylmethane
2,2'-diaminodiphenylmethane
4,4'-diaminodiphenylmethane (4,4'-diaminoditane)
2,4'-diaminodiphenylmethane, 2,2'-dinitro-4,4'-diaminodiphenylmethane
4-nitro-2,4'-diaminodiphenylmethane
4,4'-diamino-2,2'-ditolylmethane
4,4'-diaminotriphenylmethane
2,4-diaminophenol
2,5-diaminophenol
3,4-diaminophenol
3,5-diaminophenol
2,6-diaminophenol
2,4-diaminodiphenylamine
4,4'-diaminodiphenylamine, ethylenedianiline, m-aminophenethylamine, di-p-aminophenylacetylene
4,4''-diamino-o-terphenyl, 4,4'-diaminodiphenyl ether, 2,4-diaminoanisole
1,2-diaminophenetole
4,4'-diaminodiphenylethane (diaminodibenzyl)
2,2-diaminobenzophenone
3,3'-diaminobenzophenone
4,4'-diaminobenzophenone
1,2-naphthylenediamine
1,4-naphthylenediamine
1,5-naphthylenediamine
1,6-naphthylenediamine, 1,7-naphthylenediamine, 1,8-naphthylenediamine, 2,3-naphthylenediamine
2,6-naphthylenediamine
2,7-naphthylenediamine
2-phenyl-1,3-naphthylenediamine
2-methyl-1,4-naphthylenediamine
3,4-diamino-1-naphthol
3,4-diaminoacenaphthene
4,4'-sulfonyldianiline
2,2'-diaminostilbene (α), 2,2'-diaminostilbene (B)
4,4'-diaminostilbene
2,4'-diaminostilbene
1,4-phenylenediamine
1,3-phenylenediamine
2,4-tolylenediamine
Benzidine
3,3-dimethoxylbenzidine and the like.

Examples of aliphatic diamines which mal be reacted with alkyl isocyanates in accordance with Method A, above, in preparing alkylenebis(3-alkylurea)s suitable for nitrosation to produce our new compounds are:

Methylenediamine
Ethylenediamine
Propylenediamine
Butylenediamine
Pentamethylenediamine
Hexamethylenediamine
Heptamethylenediamine
Octamethylenediamine
1-hexyl-1,12-octadecylenediamine
1,1,2,3-tetramethyl-1,3-propylenediamine
1,1,3-trimethyl-1,3-propylenediamine
1-methyl-1,3-diethyl-1,3-propylenediamine
1,2,3-trimethyl-1-ethyl-1,3-propylenediamine and the like.

Examples of alkylisocyanates suitable for reaction with the above diamines are the lower alkylisocyanates, such as methyl, ethyl, propyl, and butyl isocyanates.

The foregoing diamines may be converted to diisocyanates by reacting them with phosgene in known manner, and the resulting diisocyanates reacted with alkylamines to produce corresponding alkylenebis-(3-alkylurea)s or arylenebis(3-alkylurea)s in accordance with Method B above.

As used herein, the term "toluylene" refers to the bivalent radical $CH_3C_6H_3=$, sometimes also called "toluylene."

Our invention will be further illustrated by reference to the following detailed examples, in which all parts are by weight:

*Example 1*

With stirring and cooling, 126 parts of methyl isocyanate was added dropwise at 0° to 5° C. to a solution of 63 parts of ethylene diamine in 242 parts of methyl ethyl ketone. The semi-solid mass was filtered to give 189 parts of 1,2-ethylenebis(3-methylurea). Recrystallization from a 1 to 1 mixture by volume of methanol and ethylene dichloride gave a material which melted at 218° to 219° C. *Analysis.*—Calc. for $C_6H_{14}N_4O_2$: C, 41.37; H, 8.10; N, 32.16. Found: C, 41.55; H, 8.18; N, 32.41.

With provisions for cooling and stirring, 17.4 parts of 1,2-ethylenebis(3-methylurea) was suspended in 90 parts of concentrated hydrochloric acid. To form a complete solution, 55 parts of concentrated sulfuric acid was necessarily added. A nitrosating solution was prepared by dissolving 15.7 parts of 97% sodium nitrite in 40 parts of water. While maintaining the temperature between 0° and 5° C., the nitrosating solution was added to the acidic substituted urea solution. The mixture was stirred for about one hour longer and poured into 150 parts of ice. The product was recovered by filtration, washed with cold water and air dried. The crude yield was 16.7 parts (71.9% of theory) of 1,2-ethylenebis(3-methyl-3-nitrosourea). A sample which was recrystallized from ethanol decomposed at 126° to 128° C. Reduction of the nitroso group with standard chromous chloride required 98.7% of theory for 1,2-ethylenebis(3-methyl-3-nitrosourea).

*Example 2*

A solution of 77.5 parts of 1,6-hexamethylenediamine in 158 parts of dry acetone was formed by stirring and heating to about 40° C. With cooling to maintain the temperature, 83.7 parts of methyl isocyanate was added dropwise. The mixture was cooled and filtered to give 121.7 parts of 1,6-hexamethylenebis(3-methylurea). Recrystallization from ethanol gave a sample which melted at 201° C. *Analysis.*—Calcd. for $C_{10}H_{22}N_4O_2$: C, 52.15; H, 9.63; N, 24.33. Found: C, 52.04; H, 9.76; N, 24.56.

A solution of 10 parts of 1,6-hexamethylenebis(3-methylurea) in 92 parts of concentrated sulfuric acid was treated at 0° to 5° C. with 6.8 parts of 97% sodium nitrite. Solid began separating from solution after about one-third of the sodium nitrite had been added. The slurry was stirred for 30 minutes and treated with 40 parts of water. After stirring for 2 hours more, the yellow slurry was poured into 200 parts of ice, filtered, washed with ice-water and air dried. The yield was 8.1 parts of 1,6-hexamethylenebis(3-methyl-3-nitrosourea) (64.6% of theory). The crude material was recrystallized from 80 parts of a mixture composed of 2 parts of isopropyl alcohol to 1 of ethyl alcohol. The product melted at 102° to 103° C. and decomposed at about 140° C. *Analysis.*—Calcd. for $C_{10}H_{20}N_6O_4$: C, 41.66; H, 6.99; N, 29.15; NO, 20.8. Found: C, 41.23; H, 6.96; N, 29.05; NO, 20.4±0.5.

*Example 3*

With cooling and stirring, 10 parts of 1,6-hexamethylenebis(3-methylurea) was dissolved in 59.5 parts of concentrated hydrochloric acid and 9.2 parts of concentrated sulfuric acid. At 0° to 5° C., the acidic substituted urea solution was treated with a solution composed of 6.8 parts of 97% sodium nitrite in 20 parts of water. After being stirred for one hour the mixture was diluted in 150 parts of ice, filtered, washed with ice-water and air dried. The yield was 12.3 parts of 1,6-hexamethylenebis(3-methyl-3-nitrosourea) (98.3% of theory).

Example 4

A solution of 90.2 parts of ethylene diamine in 1256 parts of ethylene dichloride was treated dropwise with 327 parts of N-butyl isocyanate at 30° to 40° C. The mixture was heated to reflux for 2 hours. After cooling, the mixture was filtered to give 366.2 parts of 1,2-ethylenebis(3-butylurea). A sample which was recrystallized from ethanol melted at 216° to 217° C. *Analysis.*—Calcd. for $C_{12}H_{26}N_4O_2$: C, 55.9; H, 10.1; N, 21.7. Found: C, 55.60; H, 9.67; N, 21.3.

At 0° to 5° C., 26.7 parts of 1,2-ethylenebis(3-butylurea) was added to 368 parts of concentrated sulfuric acid. To this was added 15.5 parts of sodium nitrite and 30 parts of water. The yellow mixture was poured into 600 parts of ice and filtered to give 48.5 parts of crude product. Recrystallization from isopropyl alcohol gave 17 parts of 1,2-ethylenebis(3-butyl-3-nitrosourea) which decomposed at 97° to 99° C. *Analysis.*—Calcd. for $C_{12}H_{24}N_6O_4$: C, 45.6; H, 7.65; N, 26.5. Found: C, 44.98, 44.95; H, 7.43, 7.03; N, 26.08.

Morpholine was reacted with the 1,2-ethylenebis(3-butyl-3-nitrosourea) to give as a derivative, 1,2-ethylenebis(N-carbamylmorpholine). This indicates the location of the nitroso groups to have been in the 3-positions.

Example 5

With rapid stirring 39.1 parts of ethyl isocyanate was added dropwise to a solution of 29.1 parts of 1,6-hexamethylenediamine in 317 parts of acetone. The mixture was heated to reflux for about 3 hours, cooled and filtered to give 42.2 parts of 1,6-hexamethylenebis(3-ethylurea). A sample which was recrystallized from ethanol melted at 200.5° to 201.5° C. *Analysis.*—Calcd. for $C_{12}H_{26}N_4O_2$: C, 55.8; H, 10.1; N, 21.7. Found: C, 55.96; H, 10.04; N, 21.31; 21.33.

At 0° to 5° C. 12.9 parts of 1,6-hexamethylenebis(3-ethylurea) was dissolved in 184 parts of concentrated sulfuric acid. At the same temperature was added 9 parts of sodium nitrite followed by 25 parts of water. The mixture was stirred a few minutes and poured into about 750 parts of ice with stirring. Stirring was stopped for a few minutes to allow the precipitated material to crystallize without agglomeration. The mixture was filtered to give 19.3 parts of crude 1,6-hexamethylenebis(3-ethyl-3-nitrosourea). A sample which was recrystallized from alcohol decomposed at 92° to 96° S. *Analysis.*—Calcd. for $C_{12}H_{24}N_6O_4$: C, 45.6, 7.7; N, 26.5. Found: C, 45.22, 45.05; H, 7.38, 7.25; N, 26.28.

Morpholine was reacted with the 1,6-hexamethylenebis(3-ethyl-3-nitrosourea) to give as a derivative, 1,6-hexamethylenebis(N-carbamylmorpholine). This product indicated that the nitroso groups were located in the 3-positions.

Example 6

With stirring and heating to 65° to 75° C., 67.5 parts of octadecylamine was dissolved in 627 parts of ethylene dichloride and treated dropwise with 96 parts of 2,4-tolylene diisocyanate. The mixture was heated to reflux for 1 hour, cooled and filtered to give 78.5 parts of crude 2,4-tolylenebis(3-octadecylurea). A sample which was recrystallized from alcohol melted at 168° to 170° C. *Analysis.*—Calcd. for $C_{45}H_{84}N_4O_2$: C, 75.8; H, 11.86; N, 7.86. Found: C, 75.21, 75.58; H, 11.61, 11.75; N, 7.84.

A solution of 14.3 parts of 2,4-tolylenebis(3-octadecylurea) in 1000 parts of concentrated sulfuric acid was treated at 0° to 5° C. with 6 parts of sodium nitrite and, after a few minutes, with 20 parts of water. The mixture was poured into ice-water and filtered. The crude 2,4-tolylenebis(nitroso-3-octadecylurea) was recrystallized from ethanol to give 12.5 parts of product which decomposed at 84° to 85° C.

Diethyl amine was reacted with several samples of the nitroso compound to give derivatives of different melting points. The inconsistent properties of the derivatives indicate that the nitroso material was also a mixture.

Examples 7 and 8, below, illustrate the use of our novel N-nitroso compounds in the preparation of plastic foams.

Example 7

A mixture consisting of 5.0 parts of Multron 8–18 (Mobay) polyester resin,
0.1 part of 77/86 coupler (Witco)
0.1 part of N-ethylmorpholine and
0.2 part of 1,2-ethylenebis(3-methyl-3-nitrosourea)

was intimately blended and combined with 2.05 parts of 2,4-tolylene diisocyanate The mixture was heated at 100° C. in an oven for a few minutes to give a firm plastic foam having a specific gravity of about 0.26.

Example 8

A mixture consisting of 5.0 parts of Multron 8–18 (Mobay) polyester resin,
0.1 part of 77/86 coupler (Witco)
0.1 part of N-ethylmorpholine and
0.2 part of 1,6-hexamethylenebis(3-methyl-3-nitrosourea)

was intimately blended and combined with 2.05 parts of 2,4-tolylene diisocyanate The mixture was heated for several minutes in an oven to produce a stiff plastic foam.

Example 9

While maintaining the temperature at 20° to 25° C. by external cooling, 121.3 parts of methyl isocyanate was added dropwise with stirring to a solution composed of 108.1 parts of freshly recrystallized 1,4-phenylenediamine in 475 parts of acetone. The mixture was heated to reflux, cooled and filtered. The yield was 190.6 parts of 1,4-phenylenebis(3-methylurea) or 85.5% of theory. The product is slightly soluble in 95 percent alcohol and melts above 275°. *Analysis.*—Calcd. for $C_{10}H_{14}N_4O_2$: C, 54.04; H, 6.35. Found: C, 53.98; H, 6.32.

After recrystallization from alcohol, 1.1 parts of 1,4-phenylenebis(3-methylurea) was dissolved in 42 parts of glacial acetic acid, 1.5 parts of water and 36.8 parts of sulfuric acid. At —5° to 0° C., a solution composed of 1.4 parts of sodium nitrite in 3 parts of water was added below the surface of the acid solution; no fumes were evolved but solid separated during the addition. The mixture was poured into about 80 parts of ice. The yield was 1.4 parts (99.7% of theory) of 1,4-phenylenebis(3-methyl-3- nitrosourea) and assayed 97.8%.

A sample of crude product was recrystallized from acetone. The material decomposed at 140° C. and assayed 93.52%. *Analysis.*—Calcd. for $C_{10}H_{12}N_6O_4$: C, 42.86; H, 4.32; N, 29.99. Found: C, 42.64; H, 4.34; N, 30.86.

Example 10

A solution of 50.3 parts of methyl isocyanate in 65 parts of toluene was added dropwise, with stirring, to a solution of 43.2 parts of freshly distilled 1,3-phenylenediamine in 173 parts of toluene and 125 parts of acetone. The temperature was maintained at 20° to 25° C. during the addition by external cooling and was increased to 80° C. for 10 minutes. The mixture was cooled and filtered. The product was washed with acetone and air dried. The yield was 86.9 parts (97.7% of theory) of 1,3-phenylenebis(3-methylurea). Recrystallization from acetic acid or isopropyl alcohol gave a product which melted at 225° to 226° C. *Analysis.*—Calcd. for $C_{10}H_{14}N_4O_2$: C, 54.04; H, 6.35; N, 25.21. Found: C, 54.02; H, 6.21; N, 25.14.

At 40° to 50° C., 11.1 parts of 1,3-phenylenebis(3-methylurea) was dissolved in a solution of 105 parts of glacial acetic acid, 25 parts of water and 10.1 parts of sulfuric acid. The acid solution was treated at about 5° C. with a solution composed of 15.7 parts of sodium nitrite in 25 parts of water. After stirring for about 15 minutes, the mixture was diluted in 300 parts of ice-water and filtered. The yield was 13.1 parts (93.6% of theory) of 1,3-phenylenebis(3-methyl-3-nitrosourea) and the assay was 83.4%.

A quantity of the crude material was recrystallized from alcohol giving a product which decomposed at 134° C. and assayed 90.57%. *Analysis.*—Calcd. for $C_{10}H_{12}N_6O_4$: C, 42.86; H, 4.32; N, 29.99. Found: C, 42.82; H, 4.27; N, 30.27, 30.06.

*Example 11*

At 45° C. 90 parts of 2,4-tolylenediamine was dissolved in 143 parts of acetone. While maintaining the temperature at 35° to 40° C. by external cooling, 91.3 parts of methyl isocyanate was added dropwise to the diamine solution causing the formation of a gel. To transfer the material to the filter, 595 parts of acetone was required. The yield of 2,4-tolylenebis(3-methylurea) was 126.4 parts or 73.3% of theory. The product is slightly soluble in 95% alcohol and melts at 239° to 239.5° C. *Analysis.*—Calcd. for $C_{11}H_{16}N_4O_2$: C, 55.91; H, 6.83; N, 23.72. Found: C, 56.00; H, 6.89; N, 23.63.

With cooling, 59.2 parts of 2,4-tolylenebis(3-methylurea) was dissolved in 150 parts of water and 368 parts of sulfuric acid. The acid mixture was treated over a two hour period at −5° to 5° C. with a solution of 39.1 parts of sodium nitrite in 75 parts of water. The yield was 76.0 parts (103.2% of theory) of 2,4-tolylenebis(3-methyl-3-nitrosourea). The material decomposed at 120° C. and assayed 85.22%. A sample which was recrystallized twice from toluene decomposed at 134° C. *Analysis.*—Calcd. for $C_{11}H_{14}N_6O_4$: C, 44.89; H, 4.80; N, 28.56. Found: C, 45.27, 45.32; H, 4.82, 4.83; N, 28.77, 29.23.

*Example 12*

While maintaining the temperature at 25° C. by external cooling, 62.9 parts of methyl isocyanate was added dropwise with stirring to a solution composed of 92 parts of benzidine in 554 parts of acetone. The mixture was refluxed for 30 minutes, cooled and filtered. The yield of 4,4′-biphenylenebis(3-methylurea) was 137.5 parts or 92.2% of theory. The material can be heated to 410° C. without change. *Analysis.*—Calcd. for $C_{16}H_{18}N_4O_2$: C, 64.41; H, 6.08; N, 18.78. Found: C, 64.10, 63.89; H, 6.00, 6.06; N, 18.57, 18.57.

With stirring, 14.9 parts of 4,4′-biphenylenebis(3-methylurea) was dissolved at 40° to 50° C. in 52.5 parts of acetic acid and 184 parts of sulfuric acid. The acid mixture was treated at 0° to 10° C. with 15.7 parts of sodium nitrite. After stirring for 20 minutes, the mixture was treated with 13.5 parts of water, causing the brown, black colored solution to become dark green after 7 parts of water had been added. After stirring for about 30 minutes at −5° to 0° C., the color was yellow to brown. The 20 parts of crude 4,4′-biphenylenebis(3-methyl-3-nitrosourea) assayed 69.8% and, after recrystallization from alcohol, assayed 88.28%.

*Example 13*

While maintaining the temperature at about 30° C. by external cooling, 31.4 parts of methyl isocyanate was added dropwise with stirring to a solution composed of 61.1 parts of freshly recrystallized 3,3′-dimethoxybenzidine, 303 parts of toluene and 79.2 parts of acetone. The product, 3,3′-dimethoxy-4,4′-biphenylenebis(3 - methylurea), was recovered in the usual manner. The yield was 75 parts or 83.8% of theory.

After recrystallization from alcohol, 1.0 parts of 3,3′-dimethoxy-4,4′-biphenylenebis(3 - methylurea) was dissolved in 27.6 parts of sulfuric acid and 5.3 parts of acetic acid and treated at about 0° C. with 1.0 part of solid sodium nitrite. In a dropwise manner, 15 parts of water was added. After stirring for about 15 minutes the reaction mixture was diluted in 100 parts of ice and water. The yield of brown to green 3,3′-dimethoxy-4,4′-biphenylenebis(3-methyl-3-nitrosourea) was 1.3 parts (111.8% of theory) which assayed 86.8%.

A quantity of crude product was recrystallized from ethylene dichloride giving a sample of light yellow material which decomposed at 158° C. *Analysis.*—Calcd. for $C_{18}H_{20}N_6O_6$: C, 51.92; H, 4.84. Found: C, 51,77; H, 4.40.

*Example 14*

Anhydrous methylamine was passed into a solution of 46.2 parts of 3,3′-dimethyl-4,4′-biphenylene diisocyanate in 793 parts of toluene while maintaining the temperature at 20° to 25° C. by external cooling until a reflux was noted on the Dry Ice reflux condenser. The mixture was heated at reflux for about 30 minutes, cooled and filtered. The yield was 56.8 parts of 3,3′-dimethyl-4,4′-biphenylenebis(3-methylurea) or 99.4% of theory. A recrystallized sample did not melt when heated to 340° C. *Analysis.*—Calcd. for $C_{18}H_{22}N_4O_2$: C, 66.23; H, 6.79. Found: C, 66.27; H, 7.03.

At 0° to 10° C., 16.3 parts of 3,3′-dimethyl-4,4′-biphenylenebis(3-methylurea) was dissolved in 131 parts of acetic acid, 230 parts of sulfuric acid and 10 parts of water. Treatment of this solution with 15.7 parts of sodium nitrite produced a deep red color. After the dropwise addition of 150 parts of water, the mixture was yellow with some green material on the surface. The product changed to a pastel green color over night and decomposed at 129° C. The yield was 17 parts or 88.4% of theory. A sample was redissolved in acetic acid and precipitated in water to give a yellow product, 3,3-dimethyl-4,4′-biphenylenebis(3-methyl-3-nitrosourea).

A portion of crude product which was recrystallized from alcohol decomposed at 128.5° C. *Analysis.*—Calcd. for $C_{18}H_{20}N_6O_4$: C, 56.24; H, 5.24; N, 21.86. Found: C, 56.48; H, 5.44; N, 21.84.

*Example 15*

While maintaining the temperature at 20° to 30° C. by external cooling, anhydrous methylamine was added to a solution of 25 parts of 4,4′-diphenylmethane diisocyanate and 347 parts of dry toluene. The mixture was heated to 80° C. for 10 minutes, cooled and filtered. The yield was 30.5 parts of 4,4′-diphenylmethanebis(3-methylurea) or 97.5% of theory. A sample which was recrystallized once from a 1:1 mixture of ethanol and dimethylformamide and once from a 1:1 mixture of dimethylformamide and methyl ethyl ketone melted at 255° C. *Analysis.*—Calcd. for $C_{17}H_{20}N_4O_2$: C, 65.36; H, 6.45; N, 17.94. Found: C, 65.23; H, 6.58; N, 18.31, 18.16.

At about 18° C., 15.6 parts of 4,4′-diphenylmethanebis(3-methylurea) was dissolved in 420 parts of acetic acid and 10 parts of water. A solution of 28.5 parts of sodium nitrite in 10 parts of water was added dropwise. After stirring for about 20 minutes, the mixture was diluted in 600 parts of ice and water. The yield of crude light tan 4,4′-diphenylmethanebis(3-methyl-3-nitrosourea) was 9.1 parts or 49.1% of theory. A sample which was recrystallized from alcohol analyzed 94.2% and decomposed at 119° C. *Analysis.*—Calcd. for $C_{17}H_{18}N_6O_4$: C, 55.13; H, 4.90; N, 22.69. Found: C, 55.50, 55.47; H, 5.02, 4.92; N, 22.06, 21.78.

*Example 16*

Anhydrous methylamine was added to a solution of 87.2 parts of a mixture of 2,4- and 2,6-toluene diisocyanate (approximately 80% 2,4-isomer) in 694 parts of dry toluene until reflux was noted on the Dry Ice condenser. The product was recovered after the usual treatment to give a yield of 105 parts of a mixture of 2,4- and 2,6-tolylenebis(3-methylurea) or 88.8% of theory. The product melted at 230° C.

At 25° C., 59.2 parts of an 80/20 mixture of 2,4- and 2,6-tolylenebis(3-methylurea) was dissolved in 368 parts of sulfuric acid and 150 parts of water. A second solution composed of 39.1 parts of sodium nitrite in 75 parts of water was added dropwise at −5° to 0° C. over a 2.0 hour period. The yield of crude light tan mixture of 2,4- and 2,6-tolylenebis(3-methyl-3-nitrosourea) was 66 parts or 89.6% of theory. A sample which was recrystallized from toluene decomposed at 105° to 107° C. and assayed 85.6%.

*Example 17*

A solution of 46 parts of purified benzidine in 317 parts of acetone was treated at 25° to 30° C. with 39 parts of ethyl isocyanate. The mixture was heated at reflux for 30 minutes, cooled and filtered to give 65.7 parts of product. A sample was dissolved in tetramethylurea and precipitated by the addition of ethanol. The 4,4'-biphenylenebis(3-ethylurea) darkened at 255° C. but did not melt below 280° C. *Analysis.*—Calcd. for $C_{18}H_{22}N_4O_2$: C, 66.24; H, 6.79; N, 17.17. Found: C, 66.12; H, 6.80; N, 17.14, 17.09.

A solution of 16.3 parts of 4,4'-biphenylenebis(3-ethylurea) in 105 parts of glacial acetic acid and 368 parts of concentrated sulfuric acid was treated with 15.7 parts of sodium nitrite and 15 parts of water. After stirring for 5 minutes, the mixture was poured into 1000 parts of ice with stirring. The mixture was filtered to give 20.4 parts of crude 4,4'-biphenylenebis(3-ethyl-3-nitrosourea).

The nitroso product was reacted with diethylamine to give the 4,4'-biphenylenebis(3,3-diethylurea) as a derivative. This product indicated that the nitroso groups were located in the 3-positions.

In the arylenebis- and alkylenebis(3-alkylurea)s used in preparing our novel compounds, alkyl groups on the terminal nitrogens having from one up to four carbon atoms have been found particularly successful in directing nitrosation to the 3-position, although nitrosation of bis(3-alkylureas) in which the alkyl groups are larger has been effected though less satisfactorily insofar as purity and yield of the 3-nitrosourea obtained, is concerned.

Our novel compounds are not only useful as foaming and coupling agents in the production of, for example, foamed products from polyurethane and polyvinyl chloride resins, but are also useful as intermediates for producing diisocyanates; for producing substituted ureas, by reaction with amines; and for producing substituted urethanes or carbamates by reaction with alcohols.

This application is a continuation-in-part of our co-pending applications, Serial No. 769,303, filed October 24, 1958, and Serial No. 769,584, filed October 27, 1958, both now abandoned.

We claim:
1. A compound having the formula:

wherein R is selected from the group consisting of phenylene, tolylene, biphenylene, dimethyl biphenylene, dimethoxy biphenylene and methylene diphenylene, and R' is lower alkyl.

2. 1,4-phenylenebis(3-methyl-3-nitrosourea).
3. 1,3-phenylenebis(3-methyl-3-nitrosourea).
4. 2,4-tolylenebis(3-methyl-3-nitrosourea).
5. 2,6-tolylenebis(3-methyl-3-nitrosourea).
6. 4,4'-biphenylenebis(3-methyl-3-nitrosourea).
7. 3,3' - dimethyl-4,4'-biphenylenebis(3-methyl-3-nitrosourea).
8. 4,4'-diphenylmethanebis(3-methyl-3-nitrosourea).
9. 3,3'-dimethoxy-4,4'-biphenylenebis(3-methyl-3-nitrosourea).

References Cited in the file of this patent

UNITED STATES PATENTS 2,683,696    Muller et al. _____ July 13, 1954

OTHER REFERENCES

Conant et al.: Chem. of Org. Compounds, Third Edition, 1947, p. 332.
Bergmann: Chem. of Acetylenic and Related Compounds, Interscience, 1948, p. 80.
Lieser et al.: Chem. Ber., vol. 83 (1950), pp. 137–41.
Whitmore: Organic Chemistry, Second Edition, 1951, pp. 160–1, 711 and 787.